United States Patent [19]
Teets et al.

[11] Patent Number: 5,694,683
[45] Date of Patent: Dec. 9, 1997

[54] HOT FORMING PROCESS

[75] Inventors: J. Michael Teets, Hobe Sound; Douglas R. Burnham, Stuart, both of Fla.

[73] Assignee: Chromalloy Gas Turbine Corporation, San Antonio, Tex.

[21] Appl. No.: 49,533

[22] Filed: Apr. 20, 1993

[51] Int. Cl.$^6$ .................................................. B23P 15/00
[52] U.S. Cl. ............................. 29/889.721; 29/889.7
[58] Field of Search ................. 72/342.7, 342.8, 72/342.92, 342.1; 29/889.7, 889.71, 889.72, 889.721

[56] References Cited

U.S. PATENT DOCUMENTS

| | | | |
|---|---|---|---|
| 2,869,611 | 1/1959 | Stalker | 29/889.721 |
| 3,025,905 | 3/1962 | Haerr | 72/342.92 |
| 3,057,393 | 6/1962 | Clark | 129/889.7 |
| 3,707,750 | 1/1973 | Klass | 29/889.721 |
| 4,108,572 | 8/1978 | Platt | 416/230 |
| 4,145,908 | 3/1979 | Miller | 72/342 |
| 4,301,584 | 11/1981 | Dillner et al. | 29/156.8 B |
| 4,318,672 | 3/1982 | Hansen | 416/224 |
| 4,527,410 | 7/1985 | Mac Nitt Jr., et al. | 72/306 |
| 4,559,797 | 12/1985 | Raymond | 72/342.8 |
| 4,838,069 | 6/1989 | Walker et al. | 72/342.1 |
| 5,035,579 | 7/1991 | Yada et al. | 416/241 R |
| 5,063,662 | 11/1991 | Porter et al. | 29/889.72 |
| 5,141,400 | 8/1992 | Murphy et al. | 416/204 A |
| 5,144,825 | 9/1992 | Burg et al. | 72/60 |
| 5,210,946 | 5/1993 | Monroe | 29/889.71 |

FOREIGN PATENT DOCUMENTS

| | | | |
|---|---|---|---|
| 0003367 | 2/1967 | Sweden | 29/889.72 |
| 0770787 | 3/1957 | United Kingdom | 29/889.72 |
| 0786728 | 11/1957 | United Kingdom | 29/889.72 |

OTHER PUBLICATIONS

S. Kandebo, *GE90 Team Runs Agressive Program to Hold Engine Development Schedule*, Aviation Week & Space Technology; Jun. 22, 1992, pp. 67–68.

*Primary Examiner*—Irene Cuda
*Attorney, Agent, or Firm*—Mitchell D. Bittman

[57] ABSTRACT

A process is provided for forming a metallic edge having a three dimensional internal configuration by preparing a metallic edge blank having a two dimensional internal configuration; attaching a flange to the sides of the blank; preheating the blank, forming mandrel and receiver dies to a temperature at which the metal is in a malleable state, with the forming mandrel having an external surface which corresponds to the three dimensional internal configuration of the formed metallic edge; and hot forming the metallic edge by securing the blank within the receiver dies and advancing the mandrel into the inner cavity of the blank through use of a drive means which rotates the mandrel as it advances into the blank while maintaining the blank, mandrel and receiver dies at the malleable temperature.

14 Claims, 6 Drawing Sheets

HOT FORMING PROCESS

BACKGROUND OF THE INVENTION

This process relates to a hot forming process for manufacturing an edge having a three dimensional internal configuration, and more particularly for hot forming an edge strip for application to gas turbine fan blades, vanes or similar airfoil structures.

Current methods produce aircraft fan blades which are solid and made from various alloys including titanium alloys. Typical manufacturing processes incorporate conventional forge/blanking, CNC milling and hand benching or CNC final grinding for final contour requirements. This is related to the complete blade, which includes the airfoil, platform and root attachment areas.

The next generation of commercial aircraft are being designed for increased load carrying capability. Correspondingly larger thrust size engines will be necessary for the conventional 2, 3 and 4 engine aircraft configurations. With the new high by-pass ratios (fan area airflow to engine core airflow) larger fan blades are required. Using current production blade design technology and related metals the attachment stresses would be too high and therefore it is necessary to review alternative methods of manufacture, material selection (metallic or non-metallic) and structural make-up in the new blade design. A non-metallic blade design can be utilized incorporating a titanium leading edge for foreign object damage protection. However, this leading edge will require a three dimensional internal configuration which is impractical for conventional milling techniques. This invention provides a manufacturing method which takes a 2D titanium preform and hot form forges a 3D internal shape, with subsequent external machining.

SUMMARY OF THE INVENTION

Briefly, this invention provides a process for forming a metallic edge having a three dimensional internal configuration by: preparing a metallic edge blank having a two dimensional internal configuration; attaching a flange to the sides of the blank; preheating the blank, forming mandrel and receiver dies to a temperature at which the metal is in a malleable state, with the forming mandrel having an external surface which corresponds to the three dimensional internal configuration of the formed metallic edge; and hot forming the metallic edge by securing the blank within the receiver dies and advancing the mandrel into the inner cavity of the blank through use of a drive means which rotates the mandrel as it advances into the blank while maintaining the blank, mandrel and receiver dies at the malleable temperature.

BRIEF DESCRIPTION OF THE DRAWINGS

In the following, the invention will be explained in further detail with reference to the accompanying drawing, in which.

DETAILED DESCRIPTION OF THE INVENTION

Figure 2:
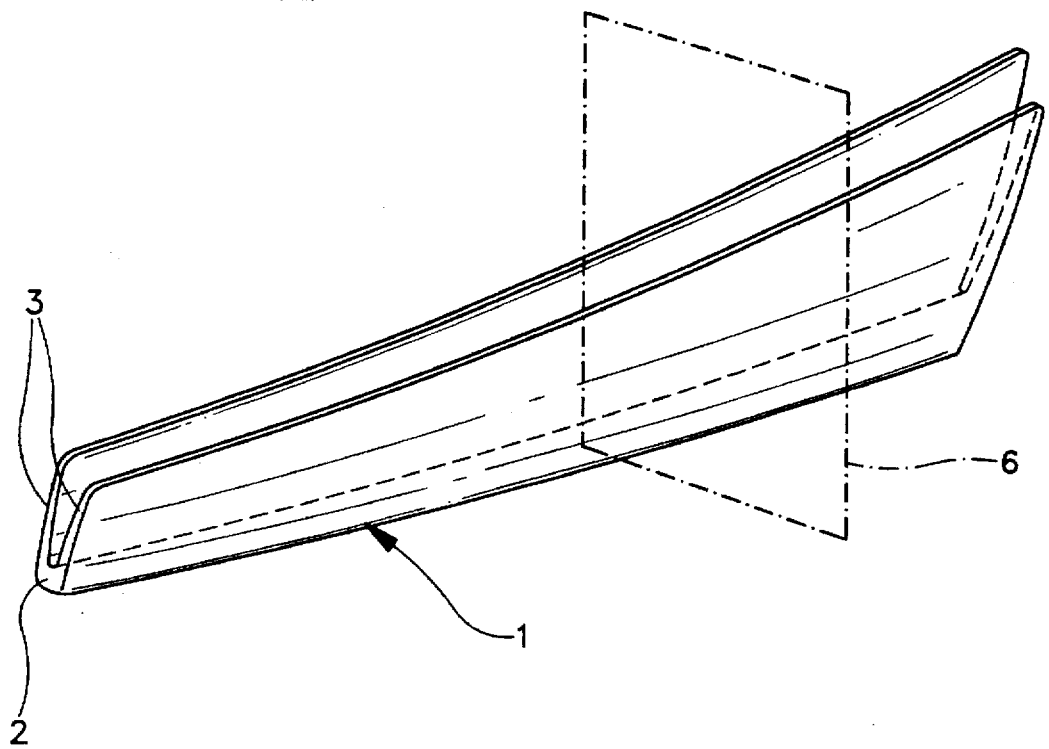
FIG. 2 is a perspective view of a formed and machined leading edge of a fan blade.
Figure 3:
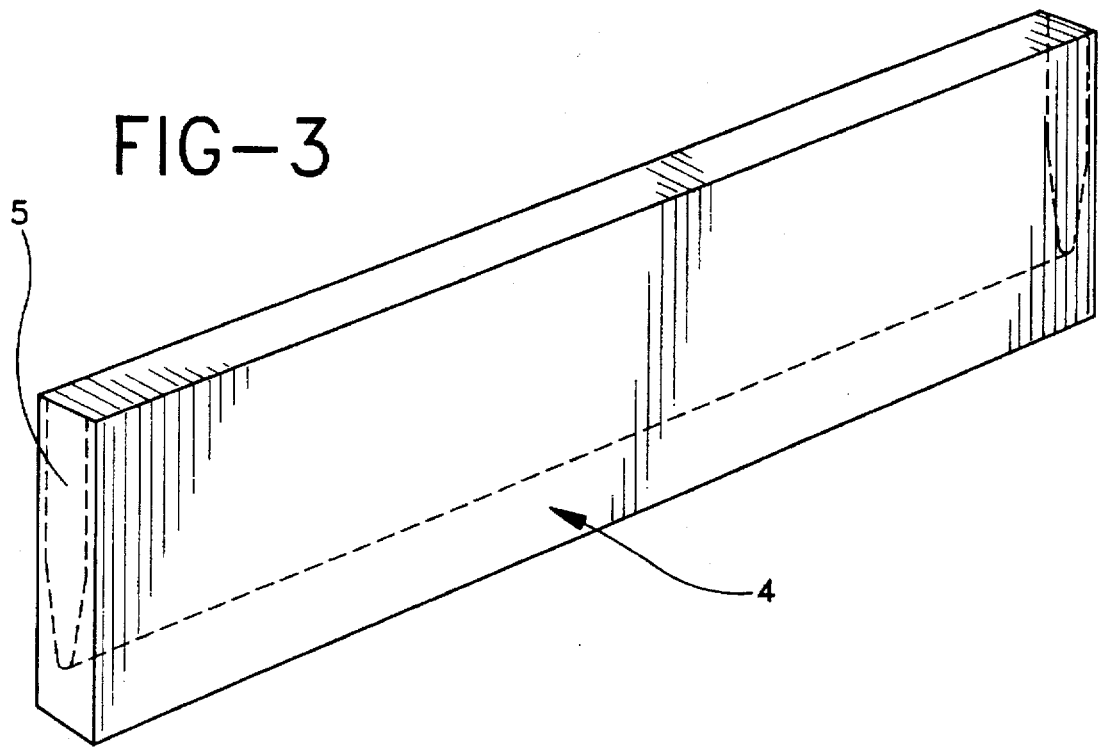
FIG. 3 is a perspective view of a solid block of metal showing the outline of the edge blank to be machined in preparation for hot forming.

The process of this invention provides a hot forming/forging system which takes a two dimensional (2D) metal edge blank and forms an edge (detail) with a three dimensional (3D) internal configuration. As shown in FIG. 2, the edge 1 is an elongated strip of metal which in an end view shows a nose portion 2 and two sides (arms) 3 extending from the nose portion—all of which are integral. As shown in FIG. 3, by a two dimensional (2D) metal edge blank what is meant is that the construction of the blank extends in only 2 directions, i.e. having a constant cross sectional inner shape. As shown in FIG. 2, by an edge with a three dimensional (3D) internal configuration what is meant is that the internal shape of the edge has an infinite amount of varying angles, i.e. having an infinite cross sectional internal shape (internal shape is twisted with varying angles).

The metallic edge with a 3D internal configuration can be used as a wearing nose to be secured around the edge of an article. In particular the edge is suited for attachment to blades, vanes or similar airfoil structures, wherein the edge can be a leading edge utilized to protect the underlying article which can be metallic or non-metallic (e.g., carbon—carbon or carbon fibers and molyamid composites) from damage caused by debris, corrosion, oxidation, temperature and/or wear. Suitable metals for the metallic edge include titanium, aluminum, steel, nickel, chromium and their alloys although any number of various alloys could be utilized.

The 2D metal edge blank can be formed as shown in FIG. 3 from a solid block of metal 4 by removing the excess metal 5 by machining, e.g.; by the methods of milling, electrical discharge machining, CNC milling, chem milling, milling, electro-chemical milling and shaping. In an alternate embodiment and dependent upon the configuration of the formed metal edge, the metal edge blank can be prepared by folding a sheet of metal. The inner cavity of the edge blank which is prepared is equal to or less than the narrowest planar cross section of the inner cavity of the formed edge (blue print detail). For a typical planar cross section see reference 6 of FIG. 2. This inner cavity size is critical to obtaining an accurate inner cavity profile for the formed edge in that the forming mandrel during hot forming will only expand the cross sectional segments of the inner cavity of the blank to form the desired inner cavity profile and will not compress any segments. The outer dimension of the metal blank need not be precise and is generally an oversized material thickness reflective of the greatest planar cross section material section with the excess material to be removed after hot forming by machining the external surface of the formed metallic edge.

Figure 4:
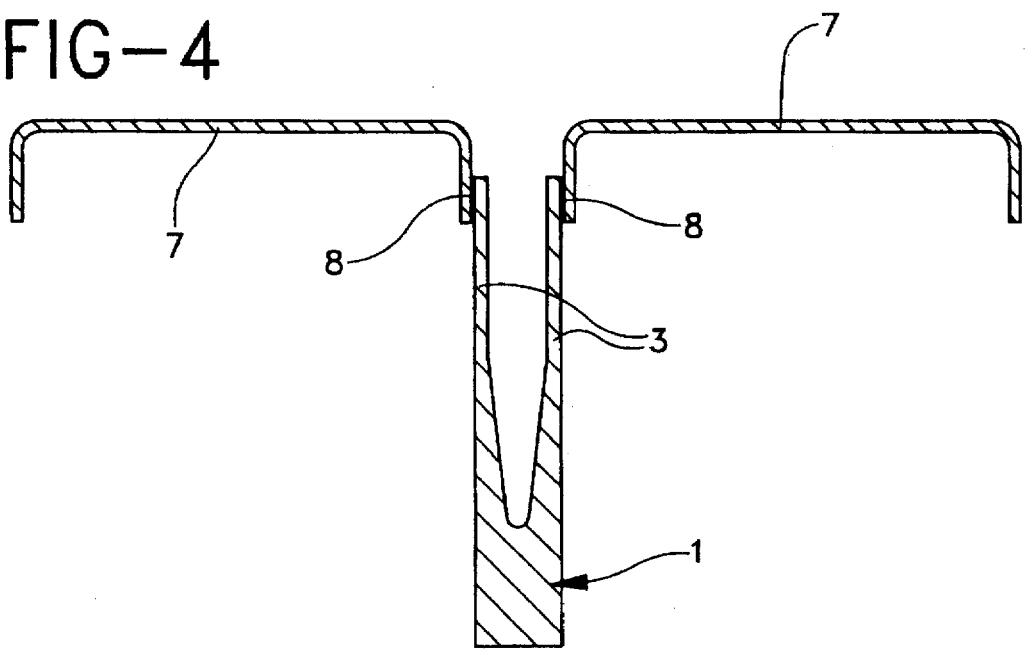
FIG. 4 is an end view of the edge blank with the flange attached.

When the metallic edge blank has been prepared then, as shown in FIG. 4, a flange 7 is attached to the sides 3 of the blank 1. The flanges are preferably attached by welding 8 onto a part of the sides of the blank which will subsequently be removed in a later machining operation. The flange can be suitably formed of similar material (e.g. titanium) and is utilized to secure and restrain the blank during the hot forming process.

Figure 1:
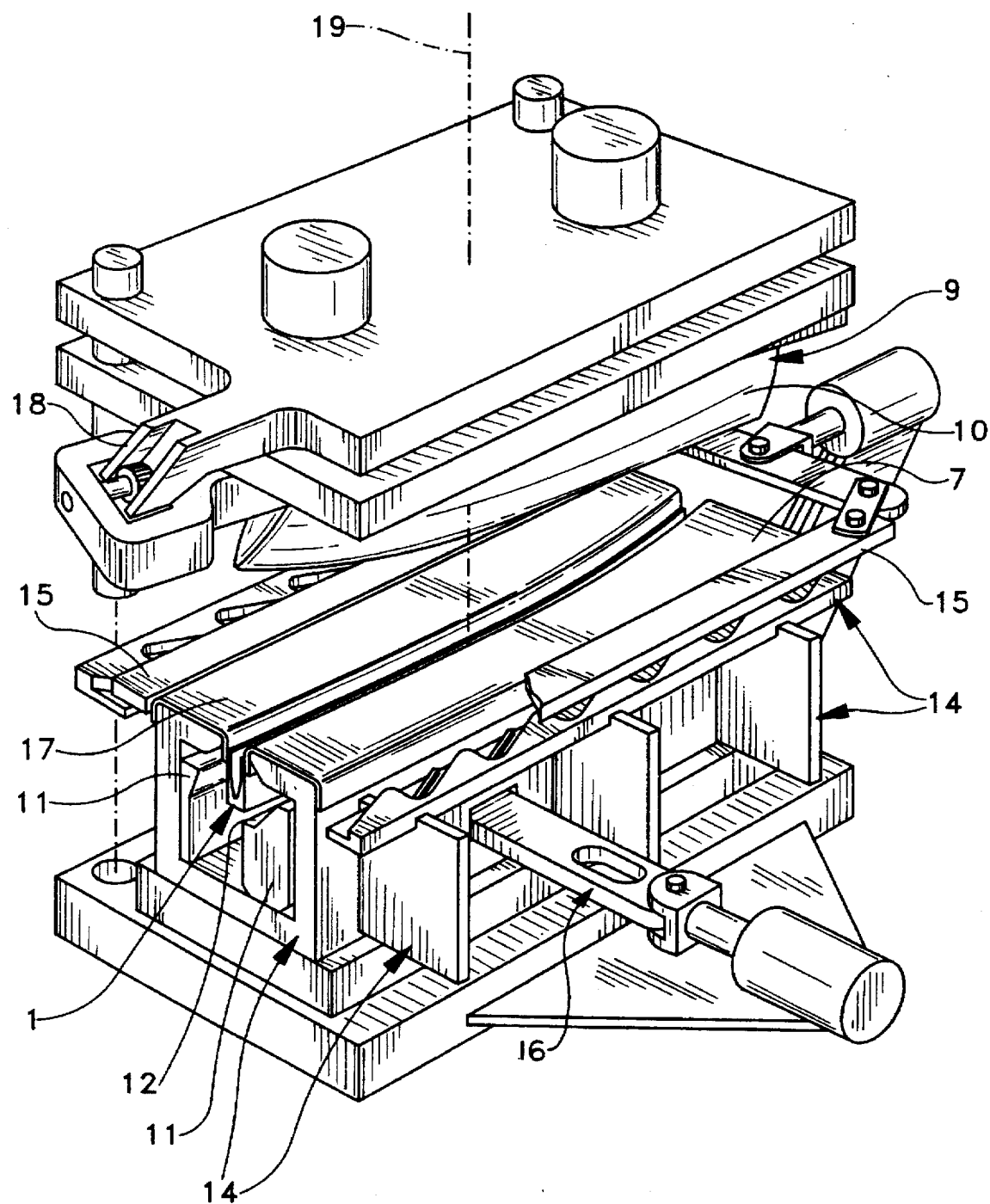
FIG. 1 is a perspective view of the apparatus of this invention.

The forming mandrel 9 is shown in FIG. 1, and has an external surface 10 which corresponds to the 3D internal configuration of the formed metallic edge. The forming mandrel is a tool representing the internal cavity cross sectional geometry of the formed edge; and is positioned as such to a determined helical axis to yield the necessary angular mandrel forming penetration as it passes into both the 2D blank and respective tools. The mandrel can be suitably manufactured of a metal which is rigid at the temperatures at which hot forming occurs, e.g. 1200°–1500° F. for forming titanium.

Figure 5:
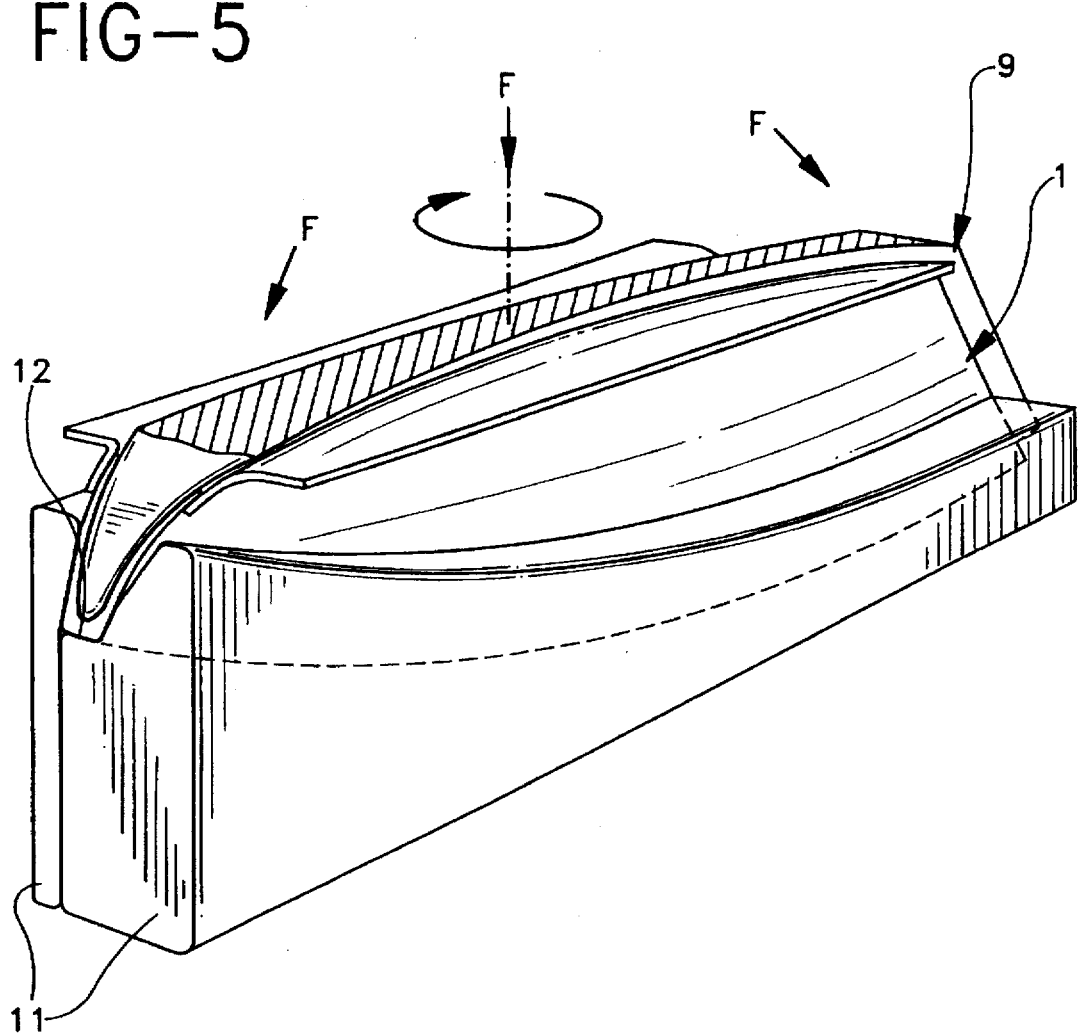
FIG. 5 is a perspective view showing the edge blank against the base section of the receiver dies with F showing the direction of force for the forming mandrel.

The forming process also utilizes receiver dies 11 which support the external surface of the blank during the hot forming and assures full contact between the internal surface of the blank and the external surface of the mandrel during forming and assures that the edge form extended tip chord area 2 (see FIG. 2) is not mispositioned during forming. The receiver dies 11 generally comprise a set of receiver dies including a base receiver area 12 (see FIG. 5), with the base receiver area being part of one of the side receiver dies 11. It is preferred to position the receiver dies 11 initially open in a die box clamp system 14 which has an opening on the top to horizontally receive the metal edge blank 1 and the mandrel 9 during hot forming and having clamps 15 to secure the flange 7 of the blank 1. It is also preferred to provide a means to provide a force to move at least one side of the receiver dies 11 against the external surface of the blank 1 during forming. This can be effected by use of rod or rods 16 which extend through the die-box clamp system 14 and communicates with the receiver dies 11.

The hot forming process is carried out by preheating the metal edge blank, forming mandrel and receiver dies to a temperature at which the metal of the blank is in a malleable state. When a titanium alloy was utilized a suitable malleable temperature was found to be in the range of 1300°–1500° F. Temperatures up to 1700° F. could be used for super plastic forming of the titanium alloy. The blank, mandrel and receiver dies are maintained at this temperature throughout the hot forming stage and are preferably maintained in an inert atmosphere.

Figure 6:
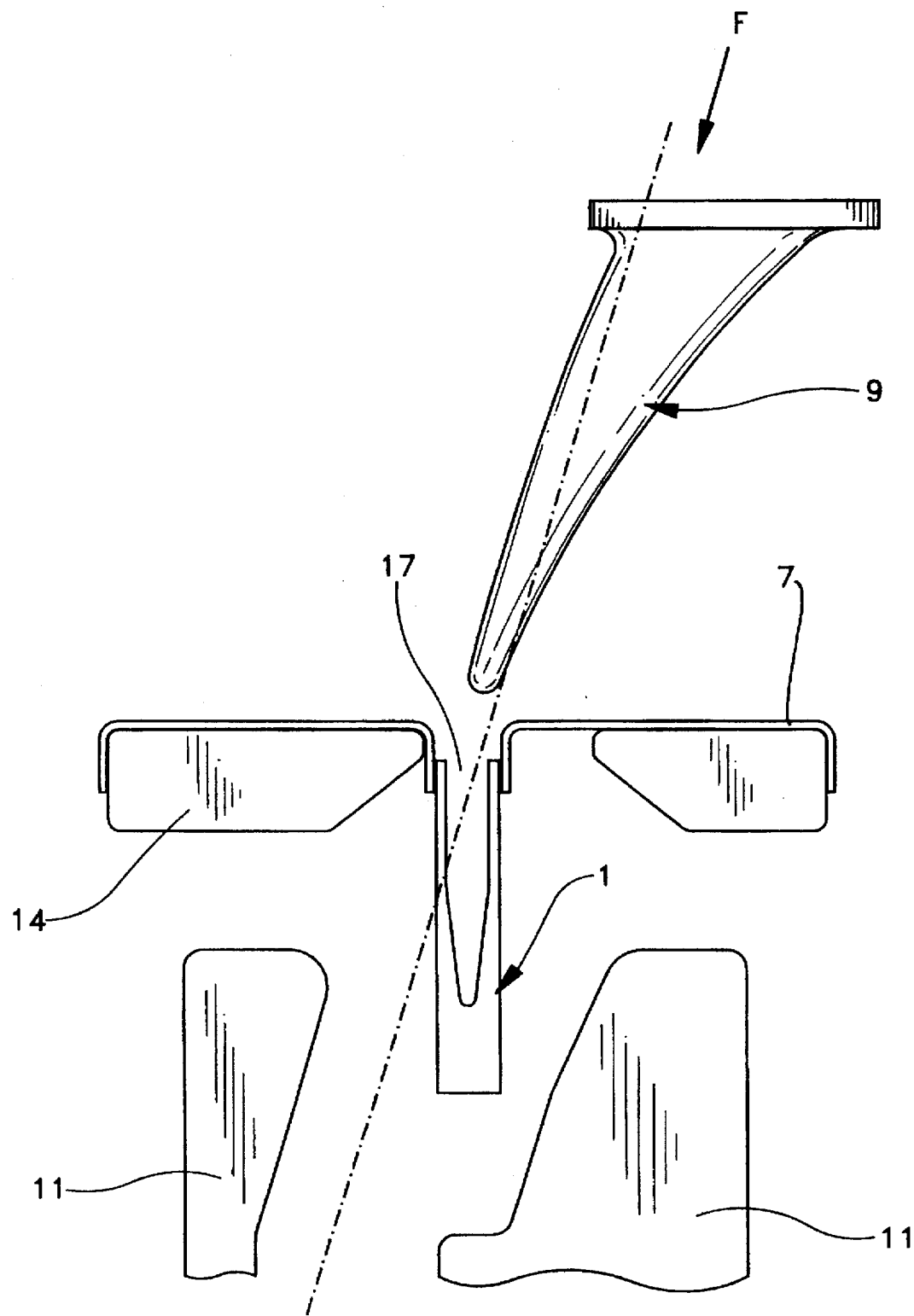
FIG. 6 shows the metal blank placed into the die-box clamp system.
Figure 7:
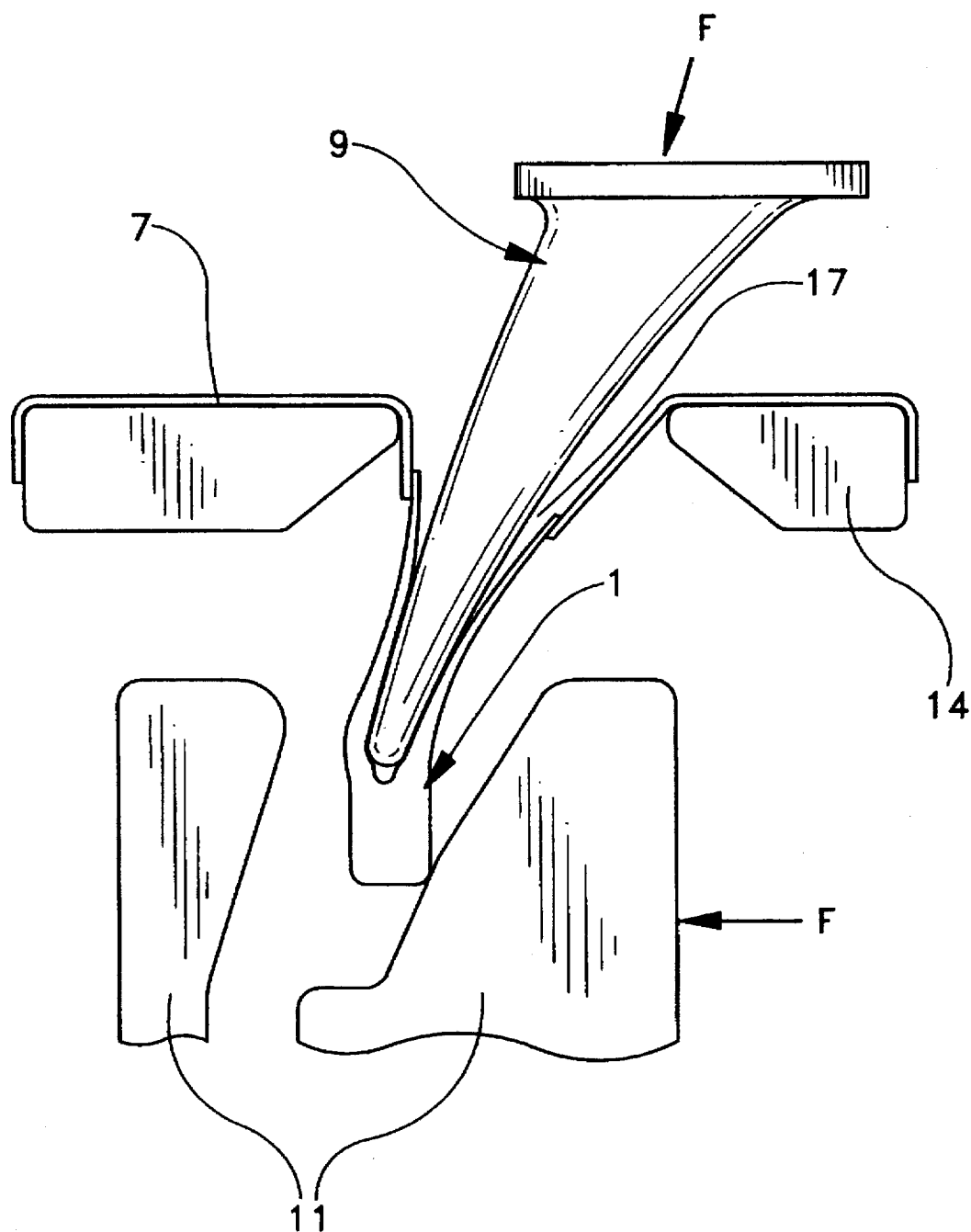
FIG. 7 shows the forming mandrel during its insertion into the metal blank.
Figure 8:
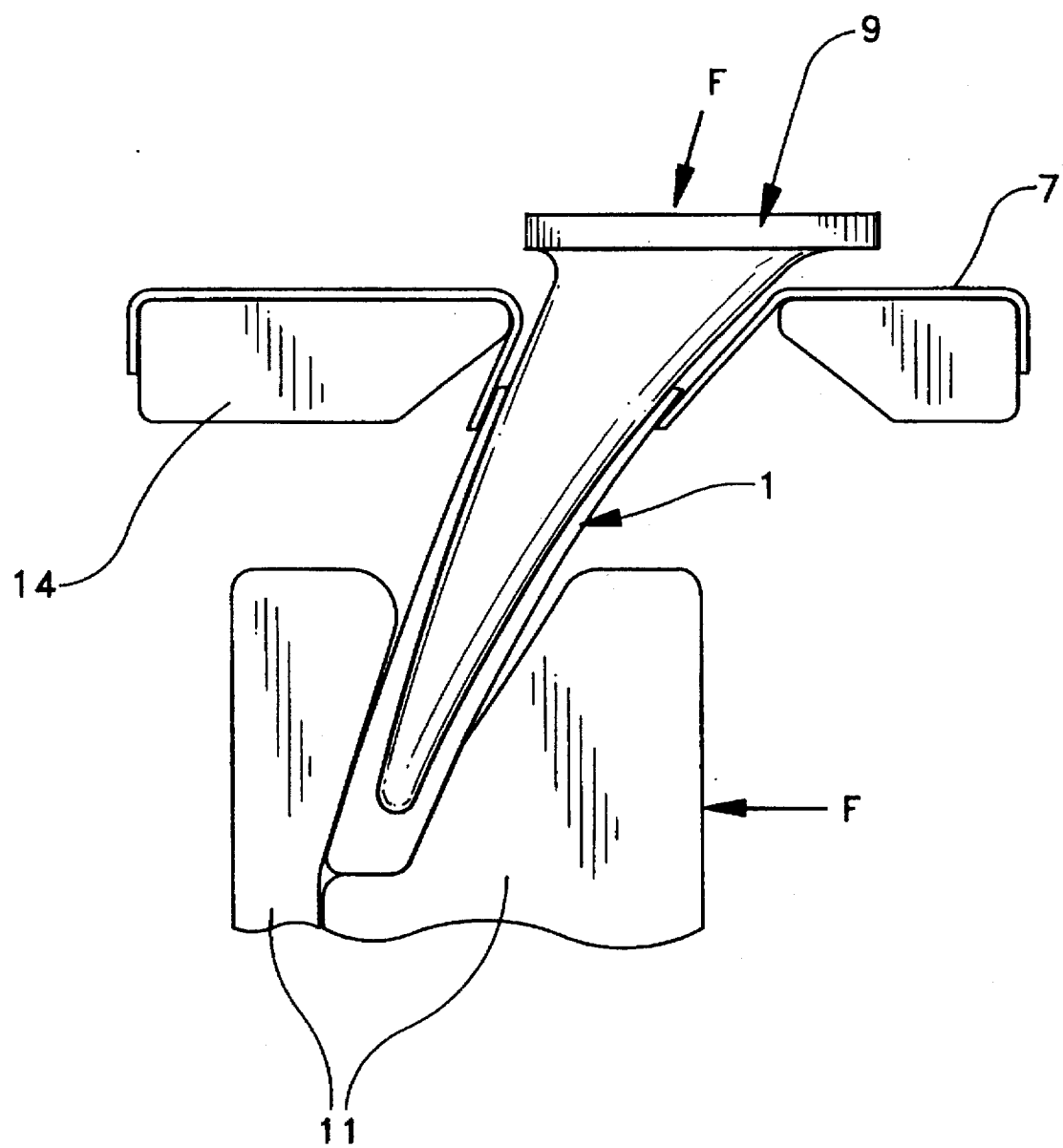
FIG. 8 shows the forming mandrel fully inserted into the metal blank providing the formed metallic edge.

During hot forming the blank 1 and flange 7 are secured within the receiver dies 11 which are in an open position, as by clamping 15 the flange 7 to the die/clamp box 14, and advancing the forming mandrel 9 into the inner cavity 17 of the blank 1 (see FIGS. 6, 7 and 8) through use of a drive means which rotates the mandrel as it advances with force F into the blank. This drive means is shown in FIG. 1 as a helix cam drive 18 which provides the desired force and rotation. Depending upon the angular internal configuration of the formed metallic edge the drive means will correspondingly rotate the mandrel about a common helix axis 19. The helix/cam drive can suitably rotate the mandrel in any degree orientation, e.g. up to 360°, with in one embodiment the mandrel being rotated up to 25° during forming. One example incorporated a 17° rotation requirement. The forming mandrel is preferably incrementally advanced into the blank to avoid fatigue and/or tearing of the metal blank. For example, when forming a titanium alloy blank incremental advancement at a rate within the range of 0.001 inches/min. to 0.100 inches/min. with non-movement periods every minute are preferred to allow stress relief and ideally match a low strain rate for the titanium. As shown in FIGS. 6, 7 and 8 the heated mandrel, mounted on a helical axis, passes into the 2D blank, causing the part to be displaced over the 3D mandrel form 9. The forming operation stops at a defined mandrel position along with a set of moveable receiver dies 11 placed about the exterior of the formed 3D edge. The moveable receiver dies assure the edge form extended tip chord area 2 is not mispositioned during the forming and that the mandrel tip contacts fully with the inner cavity of the blank.

After the forming mandrel has reached a defined position the receiver dies are retracted and the formed 3D edge is removed. While the external surface can now be machined to provide a desired external shape and finish, the shape of the internal surface is complete except for any desired finishing operation such as cleaning and polishing or roughening. The edge is suitable for attachment to an edge of an article such as by attachment as a leading edge onto a gas turbine engine fan blade or similar airfoil structure.

The external surface of the formed metallic edge can be machined and/or finished by removing the flange, trimming, grit blasting, chemical cleaning, chemical milling, heat treatment, CNC mill, hand benching and inspection.

What is claimed is:

1. A process for forming a metallic edge having a nose portion and two sides extending therefrom and having a three dimensional internal configuration with an internal shape which is twisted comprising:

preparing a metallic edge blank having a nose portion and two sides extending therefrom and having a two dimensional internal configuration with a constant cross sectional inner shape along the nose portion, wherein the inner cavity of the blank is equal to or less than the narrowest planar cross section of the inner cavity of the edge when formed;

attaching a flange to the sides of the blank to support and restrain the blank during forming;

preheating the metal edge blank, a forming mandrel and receiver dies to a temperature at which the metal of the blank is in a malleable state, the forming mandrel having an external surface which corresponds to the three dimensional internal configuration of the formed metallic edge, and the receiver dies supporting the external surface of the blank during hot forming; and hot forming the metallic edge by securing the blank and the flange within the receiver dies and advancing the mandrel into the inner cavity of the blank through use of a drive means which rotates the mandrel as it advances into the blank, while maintaining the blank, mandrel and receiver dies at the malleable temperature, and continuing the advance until the internal surface of the edge is formed over the external surface of the mandrel.

2. Process of claim 1 further comprising machining and finishing the external surface of the formed metallic edge.

3. Process of claim 2 wherein the metallic edge blank is prepared by machining from a solid block of metal.

4. Process of claim 2 wherein the metallic edge blank is prepared by folding a sheet of metal.

5. Process of claim 1 wherein the receiver dies comprise a set of two side receiver dies including a base receiver area and wherein during the hot forming process force is applied to move at least one of the receiver dies against the external surface of the blank.

6. Process of claim 1 wherein a helix cam drive rotates the mandrel as it advances.

7. Process of claim 6 wherein the helix cam drive rotates the mandrel up to 360 degrees.

8. Process of claim 7 wherein the helix cam drive rotates the mandrel from up to 25 degrees.

9. Process of claim 1 wherein the mandrel is advanced incrementally during hot forming to prevent tearing of the metal blank.

10. Process of claim 1 wherein the metal blank is fabricated from a metal chosen from the group consisting of titanium, steel, aluminum, nickel, chromium and alloys thereof.

11. Process of claim 10 wherein the metal is titanium or its alloy and the malleable temperature is within the range of about 1300° to 1700° F.

12. Process of claim 11 wherein the metallic edge being formed is a leading edge strip for a blade or vane.

13. Process of claim 1 wherein the receiver dies are positioned within a die-box/clamp system having an opening on the top to receive the metal edge blank and the mandrel during hot forming and having clamps thereon to secure the flange of the blank.

14. Process of claim 1 wherein the hot forming is carried out in an inert atmosphere.

* * * * *